May 1, 1951
C. O. JESTER
2,551,269
HINGED FUSEE HOLDER
Filed May 14, 1948
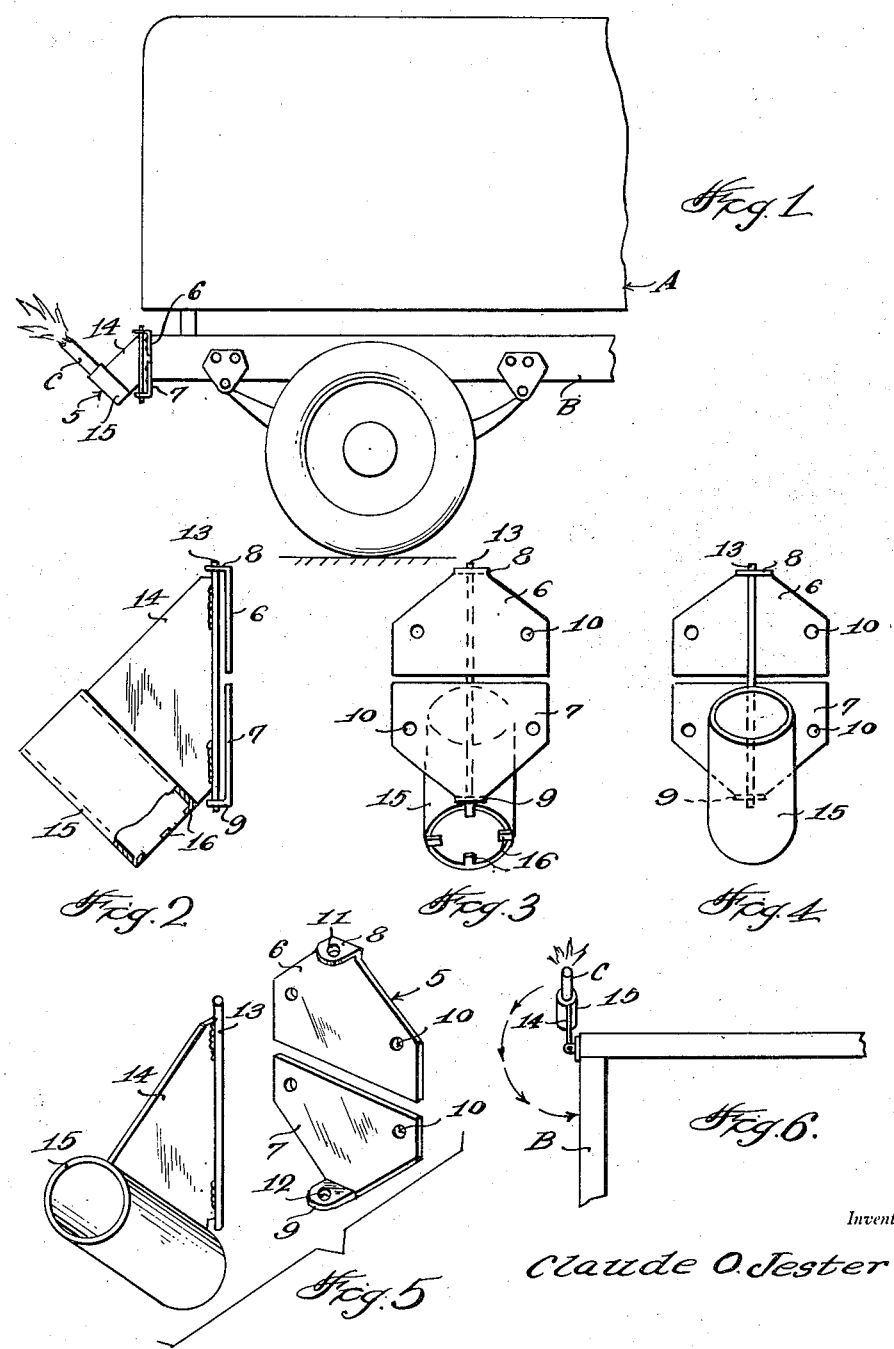
Inventor
Claude O. Jester
By Patrick D. Beavers
Attorney Patented May 1, 1951

2,551,269

UNITED STATES PATENT OFFICE 2,551,269

HINGED FUSEE HOLDER

Claude O. Jester, Muncie, Ind.

Application May 14, 1948, Serial No. 26,986

1 Claim. (Cl. 240—52)

This invention relates to improvements in holding devices for flares or fusees such as are required by law to be carried on trucks and other commercial vehicles, to the end that when such a vehicle has to stop on the roadway at night, proper warning can be given to other vehicle drivers by lighting such device, the principal object of the present invention being to provide a holder for such a warning device that will hold the flare or fusee in the proper position, clearly visible to all road traffic, while the driver of the stopped vehicle, can perform work on the vehicle or attend to other matters.

Another important object of the invention is to provide a holder of the character stated which can be permanently attached to the truck or other vehicle and hinged so that it can be swung to substantially any desired position and to a position out of the way, when not in use.

Still another important object of the invention is to provide a holder of the character stated which can be made a permanent part of all trucks and other vehicles that must pass through states having laws relative to the carrying of flares or fusees.

These and various other objects and advantages of the invention will become apparent to the reader of the following description.

In the drawing:

Figure 1 is a fragmentary side elevational view of a vehicle showing the fusee holder, in place thereon;

Figure 2 is a side elevational view of the holder with a portion in section;

Figure 3 is a rear elevational view of the holder;

Figure 4 is a front elevational view;

Figure 5 is an exploded perspective view showing the parts of the holder;

Figure 6 is a fragmentary top plan view showing a vehicle chassis equipped with the holder.

Referring to the drawing, reference character A denotes a conventional truck structure having a chassis frame B to the left rear corner of which is secured my improved fusee holder, generally referred to by numeral 5.

This holder 5 is composed of upper and lower plates 6, 7, preferably tapered upwardly as concerns the plate 6 to a forwardly bent lug 8 and downwardly as concerns the plate 7 to an outwardly bent lug 9. These plates 6, 7 have openings 10 therein, through which rivets or bolts are disposed for securing the same to a chassis B.

The lugs 8, 9 have openings 11, 12, respectively, for receiving the upper and lower ends of a pin 13 which is welded or otherwise secured to the vertical edge of a triangular shaped web or plate 14, the lower inclined edge of the plate 14 is welded or otherwise secured to a tubular socket 15, open at its upper end and provided with inwardly disposed lugs 16 at its lower end.

This socket 15 serves to receive a conventional flare or fusee C.

Referring again to the pin 13, it can be seen that the upper and lower ends of this pin project above and below the plate 14, so that they can be readily inserted through the openings 11, 12 of the lugs 8, 9, before the blades 6, 7 are secured in place against the chassis B.

Once the structure has been mounted, as shown in Figures 1 and 6, it can be swung against the side of the chassis, when not in use, or extended laterally or rearwardly to contain and properly position a fusee C.

In the operation and use of this device, when a truck stalls or for some other reason has to stop on a highway, the first thing the driver does is to secure a flare or fusee, and heretofore has had to fix the same on the ground where a nail has been provided on the fusee or stand and hold the same where the fusee has no such provision.

With the present invention, the driver simply inserts the fusee in the socket 15, ignites the same, after moving the holder socket to the proper position to give visibility all along the roadway. The driver can then proceed to attend to other matters relative to the vehicle, for instance to the purpose for which he has stopped.

Obviously, a device of this construction will be of low cost and will last the lifetime of the particular vehicle.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A fusee holder comprising a backing, a fusee receiving socket, a plate projecting from the socket and hingedly secured to the backing, said backing being composed of a pair of separable plates provided with outwardly disposed apertured lugs, said socket plate being provided with a projection, extending upwardly and downwardly therefrom and through the openings of said lugs to hingedly connect the plate to the backing.

CLAUDE O. JESTER.

REFERENCES CITED

The following references are of record in the file of this patent:

UNITED STATES PATENTS

| Number | Name | Date |
|---|---|---|
| 1,294,968 | Taylor | Feb. 18, 1919 |
| 1,776,354 | Edmands | Sept. 23, 1930 |
| 1,858,232 | Piombo | May 10, 1932 |
| 2,050,436 | Hyde | Aug. 11, 1936 |
| 2,199,990 | Godfrey et al. | May 7, 1940 |
| 2,220,407 | Joss | Nov. 5, 1940 |